(12) United States Patent
Takano et al.

(10) Patent No.: US 9,662,645 B2
(45) Date of Patent: May 30, 2017

(54) PHOTOCATALYST MEMBER

(71) Applicant: TOTO LTD., Kitakyushu-Shi, Fukuoka (JP)

(72) Inventors: Satoshi Takano, Fukuoka (JP); Shinichi Yagi, Fukuoka (JP); Tomoyasu Ichiki, Fukuoka (JP); Takahiro Hino, Fukuoka (JP); Mitoki Higashi, Fukuoka (JP)

(73) Assignee: Toto Ltd., Fukuoka (JP)

( * ) Notice: Subject to any disclaimer, the term of this patent is extended or adjusted under 35 U.S.C. 154(b) by 665 days.

(21) Appl. No.: 14/037,603

(22) Filed: Sep. 26, 2013

(65) Prior Publication Data
US 2014/0087179 A1  Mar. 27, 2014

(30) Foreign Application Priority Data

Sep. 27, 2012  (JP) ................. 2012-214527

(51) Int. Cl.
| | |
|---|---|
| *B01J 21/06* | (2006.01) |
| *B01J 35/00* | (2006.01) |
| *B01J 37/02* | (2006.01) |
| *B01J 35/02* | (2006.01) |
| *C04B 41/89* | (2006.01) |
| *C04B 41/00* | (2006.01) |
| *C04B 41/52* | (2006.01) |
| *B01J 37/08* | (2006.01) |
| *C04B 111/00* | (2006.01) |

(52) U.S. Cl.
CPC .......... *B01J 35/004* (2013.01); *B01J 21/066* (2013.01); *B01J 35/02* (2013.01); *B01J 37/0219* (2013.01); *B01J 37/0244* (2013.01); *C04B 41/009* (2013.01); *C04B 41/52* (2013.01); *C04B 41/89* (2013.01); *B01J 21/063* (2013.01); *B01J 35/002* (2013.01); *B01J 35/0073* (2013.01); *B01J 35/023* (2013.01); *B01J 37/0217* (2013.01); *B01J 37/08* (2013.01); *B01J 2523/00* (2013.01); *C04B 2111/00405* (2013.01); *C04B 2111/00827* (2013.01); *Y10T 428/265* (2015.01)

(58) Field of Classification Search
None
See application file for complete search history.

(56) References Cited

U.S. PATENT DOCUMENTS

| | | | | |
|---|---|---|---|---|
| 5,874,701 A | * | 2/1999 | Watanabe | ............... A61L 9/20 204/157.15 |
| 2005/0031532 A1 | | 2/2005 | Hedouin | |
| 2005/0137084 A1 | | 6/2005 | Krisko et al. | |
| 2005/0191505 A1 | * | 9/2005 | Akarsu | ............... B01J 35/004 428/469 |
| 2005/0214533 A1 | | 9/2005 | Shimosaki et al. | |
| 2013/0082004 A1 | | 4/2013 | Yagi et al. | |
| 2014/0017425 A1 | | 1/2014 | Yagi et al. | |

FOREIGN PATENT DOCUMENTS

| | | |
|---|---|---|
| CN | 1602282 A | 3/2005 |
| EP | 2 574 600 A1 | 4/2013 |
| JP | 08-103488 A | 4/1996 |
| JP | 10-114546 A | 5/1998 |
| JP | 11-228865 A | 8/1999 |
| JP | WO 2012133523 A1 * 10/2012 ............ B01J 21/063 |
| WO | 2012/133523 A1 | 10/2012 |

* cited by examiner

*Primary Examiner* — Alexandre Ferre
(74) *Attorney, Agent, or Firm* — Carrier Blackman & Associates, P.C.; William D. Blackman; Joseph P. Carrier

(57) ABSTRACT

Disclosed is a photocatalyst member including a glaze layer and a photocatalyst layer provided on the glaze layer, the photocatalyst layer is good in layer strength, water resistance, or abrasion resistance. More specifically, the photocatalyst member includes a base having a glaze layer and a photocatalyst layer that is provided on the glaze layer and contains titanium oxide and zirconium titanate, wherein the content of zirconium titanate in the photocatalyst layer is 15 to 75% by mass based on the total content of titanium oxide and zirconium titanate, and the content of zirconium titanate in an area from around an interface between the photocatalyst layer and the base to an median line in the thickness of the photocatalyst layer is larger than the content of zirconium titanate in an area near the external surface of the photocatalyst layer.

12 Claims, No Drawings

PHOTOCATALYST MEMBER

TECHNICAL FIELD

The present invention relates to a photocatalyst member that has a glaze layer with a photocatalyst layer provided on a surface thereof and more particularly to a photocatalyst member that has a glaze layer with a photocatalyst layer having high layer strength, water resistance, or abrasion resistance provided on a surface of thereof.

BACKGROUND ART

For a variety of applications, used are functional members that include a base having a glaze layer and a photocatalyst layer provided on a surface of the glaze layer for utilizing the decomposition activity or hydrophilization activity of the photocatalyst. For example, sanitary wares that have been treated by forming a photocatalytic surface layer on a surface of sanitary wares are known. Such sanitary wares can suppress the deposition of contaminants thereon by a hydrophilic nature developed upon exposure of the photocatalyst layer to light, preferably ultraviolet light, and, at the same time, can suppress bacterial growth by photocatalytic decomposition activity. By virtue of these properties, a cleaning burden can be alleviated.

It is required for the photocatalyst layer provided on the base to have layer strength which is high enough to withstand a service environment and, further, water resistance and abrasion resistance. For sanitary wares, e.g., JP H11 (1999)-228865A (PTL 1) proposes the use of titanium alkoxide and silicon alkoxide to enhance the layer strength of the photocatalyst layer. Further, JP H8(1996)-103488A (PTL 2) discloses gradually changing components in the photocatalyst for enhancing layer adhesion as an advantage. Some of the present inventors have proposed that a precursor of titanium oxide and a precursor of zirconium oxide are fired together to form a photocatalyst layer (PCT/JP2012/58114). These photocatalyst layers have a high level of water resistance and abrasion resistance while maintaining good photocatalytic activity. However, there is still a demand for photocatalyst members that have a high level of layer strength, water resistance, abrasion resistance and other properties while maintaining a high level of photocatalytic activity.

CITATION LIST

[Patent Literature]
[PTL 1] JP H11(1999)-228865A
[PTL 2] JP H8(1996)-103488A

SUMMARY OF THE INVENTION

The present inventors have now found that, with regulating the amount and distribution of zirconium titanate present in a photocatalyst layer provided on a glaze layer, the photocatalyst layer has a high level of layer strength, water resistance, or abrasion resistance while maintaining good photocatalytic activity. The present invention has been made based on this finding.

Accordingly, an object of the present invention is to provide a photocatalyst member having a glaze layer with a photocatalyst layer provided thereon, the photocatalyst layer is good in layer strength, water resistance, or abrasion resistance while maintaining good photocatalytic activity, and also to provide a process for producing the same.

According to one aspect of the present invention, there is provided a photocatalyst member comprising a base, a glaze layer provided on the base and a photocatalyst layer which is provided on the glaze layer and contains titanium oxide and zirconium titanate, wherein the content of zirconium titanate in the photocatalyst layer is 15 to 75% by mass based on the total content of titanium oxide and zirconium titanate; and the content of zirconium titanate in an area from around an interface between the photocatalyst layer and the glaze layer to a median line in the thickness of the photocatalyst layer is larger than the content of zirconium titanate in an area near the external surface of the photocatalyst layer.

According to another aspect of the present invention, there is provided a process for producing a photocatalyst member, the process comprising: providing a base having a glaze layer; applying as a lower layer a coating composition on the base to form a coating where the coating composition contains titanium oxide and zirconium oxide at a titanium oxide:zirconium oxide weight ratio below 80:20, and drying the coating; and applying as an upper layer a coating composition to form a coating where the coating composition contains titanium oxide and zirconium oxide at a titanium oxide:zirconium oxide weight ratio that is larger than the ratio in the coating composition for the lower layer, and firing the lower layer and the upper layer to form the photocatalyst layer.

DESCRIPTION OF THE EMBODIMENTS

Photocatalyst Member

The photocatalyst member according to the present invention includes at least a base having a glaze layer and a photocatalyst layer that is provided on the glaze layer and contains titanium oxide and zirconium titanate.

Base Having Glaze Layer

In the present invention, bases for the base having a glaze layer are not particularly limited as long as the base is able to have a glaze layer. In a preferred embodiment of the present invention, the base is a sanitary ware. The term "sanitary ware" as used herein means a ceramic ware product used in toilets and around lavatories, specifically toilet bowls, urinals, strainers for urinals, flush tanks for toilets or urinals, washbowls in washstands, or wash hand basins. The term "ware" means, among ceramic wares, those that have a degree of body sintering that is somewhat water-absorptive and has a surface to which a glaze has been applied.

Photocatalyst Layer

In the present invention, the photocatalyst layer includes titanium oxide and zirconium titanate. In the present invention, the content of zirconium titanate in the photocatalyst layer is 15 to 75% by mass based on the total content of the titanium oxide and zirconium titanate. Further, the content of zirconium titanate in an area from around an interface between the photocatalyst layer and the glaze layer to a median line in the thickness of the photocatalyst layer is larger than the content of zirconium titanate in an area near the external surface of the photocatalyst layer. Regulating the content and distribution of zirconium titanate can realize a photocatalyst layer having good layer strength, water resistance, or abrasion resistance while maintaining good photocatalytic activity. Although the present invention is not intended to be bound by any particular theory, it has been found that zirconium titanate improves the layer strength, water resistance, or abrasion resistance of the photocatalyst layer, but on the other hand, is likely to inhibit the development of photocatalytic activity of titanium oxide. Accordingly, it is considered that, zirconium titanate is allowed to exist inside the photocatalyst layer while zirconium titanate is allowed to exist in a smaller amount or is rendered absent at a portion around the surface of the photocatalyst layer that has a role in developing photocatalytic activity of the photocatalyst layer. Thus, there is provided a photocatalyst layer which is good in photocatalytic activity and, at the same time, good in layer strength, water resistance, or abrasion resistance.

As described above, the present invention is based on an idea that zirconium titanate is allowed to exist inside the photocatalyst layer while zirconium titanate is allowed to exist in a smaller amount, preferably is rendered absent at a portion around the external surface of the photocatalyst layer that has a role in developing photocatalytic activity of the photocatalyst layer. Therefore, the measurement of the content of zirconium titanate in an area near the external surface of the photocatalyst layer as well as the measurement of the content of zirconium titanate in an area from around an interface between the photocatalyst layer and the glaze layer to a median line in the thickness of the photocatalyst layer can be conducted by a method suited to confirm whether or not this idea is adopted. For example, in the present invention, the content of zirconium titanate in an area near the external surface of the photocatalyst layer means the content of zirconium titanate in a layer having a thickness from the outermost surface of the photocatalyst layer that is necessary for the measuring method, more specifically the content of zirconium titanate in an area of a thickness that is up to the half of the thickness of the photocatalyst layer, even in the thickest case. Further, in the present invention, the content of zirconium titanate in an area from around an interface between the photocatalyst layer and the glaze layer to a median line in the thickness of the photocatalyst layer can be a content obtained by taking out the photocatalyst layer in an area from around an interface of the photocatalyst layer and the glaze layer to an intermediate thickness portion of the photocatalyst layer and measuring the content of zirconium titanate. Alternatively, this may be a content obtained by measuring the content of zirconium titanate at a plurality of arbitrary points in an area from around an interface of the photocatalyst layer and the glaze layer to an intermediate thickness portion of the photocatalyst layer and averaging the obtained data.

In a preferred embodiment of the present invention, the content of zirconium titanate in the photocatalyst layer is 35% by mass as lower limit to 65% by mass as upper limit based on the total content of the titanium oxide and zirconium titanate.

In the present invention, any titanium oxide that has photocatalytic activity can be used. Titanium oxide may be any of anatase form and rutile form. Anatase form is preferred.

In the present invention, the thickness of the photocatalyst layer may be properly determined by taking applications and required photocatalytic activity and other various properties into consideration. Preferably, the layer thickness is approximately 50 nm to 200 nm. More preferably, the lower limit and the upper limit of the layer thickness are 70 nm and 120 nm, respectively.

Production Process

When a certain amount of titanium oxide and zirconium oxide are allowed to exist and are fired, zirconium titanate is formed as a composite compound. The certain amount of titanium oxide and zirconium oxide are less than the ratio of 80:20 in terms of titanium oxide:zirconium oxide weight ratio, i.e., the titanium oxide/zirconium oxide (on a weight basis) value is less than 4. Therefore, the construction that the content of zirconium titanate in an area from around an interface between the photocatalyst layer and the glaze layer to a median line in the thickness of the photocatalyst layer is larger than the content of zirconium titanate in an area near the external surface of the photocatalyst layer can be produced by the following process: the process comprises the steps of; first forming on the glaze layer a layer containing titanium oxide and zirconium oxide at a titanium oxide:zirconium oxide weight ratio below 80:20, preferably below 70:30, which can produce zirconium titanate to form a lower layer; and then forming a layer containing titanium oxide and zirconium oxide at a titanium oxide:zirconium oxide weight ratio that is higher than the titanium oxide:zirconium oxide weight ratio for the lower layer, preferably above 70:30, more preferably 80:20 or higher to form an upper layer, and firing the layers to form the photocatalyst layer. The photocatalyst layer in the present invention can be formed by regulating the titanium oxide:zirconium oxide weight ratio while taking the total amount of zirconium titanate in the photocatalyst layer into consideration.

Preferably, the photocatalyst member according to the present invention is produced as follows. Specifically, first, a coating composition containing titanium oxide and zirconium oxide at a titanium oxide:zirconium oxide weight ratio below 80:20, that is, a titanium oxide/zirconium oxide (on a weight basis) value of less than 4, is applied on the glaze layer, and the coating is dried to form a lower layer. A coating composition containing titanium oxide and zirconium oxide at a titanium oxide:zirconium oxide weight ratio that is higher than the ratio in the coating composition for the lower layer formation is then applied thereon and dried to form an upper layer. The lower layer and the upper layer are finally fired to form the photocatalyst layer. In a preferred embodiment of the present invention, a coating composition for the upper layer formation has a titanium oxide:zirconium oxide weight ratio above 70:30 is used. More preferably, the weight ratio is equal to or above 80:20. Further, in the present invention, the photocatalyst layer may be formed using three types or more of coating composition.

The photocatalyst member according to the present invention can be specifically produced by applying, preferably coating, a solution containing titanium oxide and zirconium oxide at the above desired ratio, that is, a coating solution, on a base having a glaze layer, then firing the applied (preferably coated) layer, then applying a coating composition having a desired component ratio, firing the applied layer, and repeating the above procedure.

Solvents for the coating solution include: water; alcohols such as ethanol, isopropanol, and n-butanol; cellosolves such as methyl cellosolve and butyl cellosolve; aromatic hydrocarbons such as toluene and xylene; and esters such as ethyl acetate and butyl acetate.

A method may be adopted in which titanium oxide and zirconium oxide are added to the coating composition and, further, for example, surfactants such as leveling agents for enhancing evenness of the photocatalyst layer are added thereto.

Preferred methods for the application of the coating solution on the base include commonly extensively used methods, for example, brush coating, roller coating, spray coating, roll coater coating, flow coater coating, dip coating, flow coating, and screen printing. After coating of the coating solution on the sanitary ware, firing is carried out. The firing temperature and time are preferably 600 to 900°

C. and 12 to 48 hr, respectively, more preferably 750 to 830° C. and 15 to 24 hr, respectively.

Sanitary Ware

As described above, according to one preferred aspect of the present invention, there is provided a photocatalyst member that includes a sanitary ware as a base. The ware body of the sanitary ware according to the present invention is not particularly limited and may be a conventional sanitary ware body. A glaze layer may be provided as an intermediate layer under the glaze layer having the surface properties of the outermost layer.

The sanitary ware according to the present invention can be preferably produced by the following method. Specifically, at the outset, a ware base is molded into a proper shape by casting, utilizing a water absorptive mold, of sanitary ware base slurry prepared from raw materials such as quartz sand, feldspar, and clay. Thereafter, the glaze material is coated by a properly selected commonly used method such as spray coating, dip coating, spin coating, or roll coating onto the dried molded body surface. The molded body with a precursor layer of the surface glaze layer formed thereon is then fired. The firing temperature is preferably a temperature of 1,000 to 1,300° C. at which the ware base is sintered and the glaze is softened.

The composition of the glaze for glaze layer formation in the sanitary ware according to the present invention is not particularly limited. In the present invention, the glaze material may be generally defined as a mixture of naturally occurring mineral particles such as quartz sands, feldspars, and limestones. Examples of pigments include cobalt compounds and iron compounds, and examples of opacifiers include zirconium silicate and tin oxide. Amorphous glazes refer to glazes obtained by melting a glaze material formed of a mixture of the naturally occurring mineral particles and the like at an elevated temperature and rapidly cooling the metal for vitrification, and frit glazes are suitable for use.

In a preferred embodiment of the present invention, the preferable glaze has a composition comprising, for example, 10 to 30% by weight of feldspar, 15 to 40% by weight of quartz sand, 10 to 25% by weight of calcium carbonate, not more than 10% by weight of each of corundum, talc, dolomite, and zinc flower, and not more than 15% by weight in total of an opacifier and a pigment.

EXAMPLES

The present invention is further illustrated by Examples that are not intended as a limitation of the invention.

In the Examples, the durability against water (water resistance) of a photocatalyst layer formed on a surface of sanitary ware is likely to be substantially the same as the results obtained in an alkali resistance test and, thus, was evaluated by the alkali resistance test which will be described later.

Preparation of Coating Liquid for Photocatalyst Layer Formation

Coating compositions having the composition of titanium oxide:zirconium oxide weight ratio=60:40, 70:30, 80:20, and 90:10 were provided as follows. Specifically, titanium alkoxide (compound name: titanium diisopropoxybis(acetyl acetate), tradename: NDH-510C, manufactured by Nippon Soda Co., Ltd.) and zirconium alkoxide (compound name: zirconium tributoxymonoacetyl acetate, tradename: Orgatix ZC-540, manufactured by Matsumoto Fine Chemical Co. Ltd) were mixed together so that the titanium oxide:zirconium oxide weight ratio on a solid basis after firing was 60:40, 70:30, 80:20, and 90:10. Next, the mixtures were diluted with a mixed solvent composed of 2-propanol (80%) and methyl cellosolve (20%) so that the solid content after firing was 0.5%, followed by stirring of the diluted solution. The mixed solutions thus obtained were allowed to stand for one hr or longer to prepare coating solutions.

Preparation of Ceramic Tiles

Starting materials for ceramic were cast into a body. A glaze was coated on the surface of the body with a hand spray gun (F100, manufactured by Meiji Machine Co., Ltd.). Subsequently, the glazed ceramic was fired by passage through a tunnel kiln set at a maximum temperature of 1180° C. for 24 hr while gradually raising and falling subsequently lowering the temperature to obtain a ceramic tile. The glaze had the following composition.

Composition of Glaze $SiO_2$: 55 to 80% by weight $Al_2O_3$: 5 to 13% by weight $Fe_2O_3$: 0.1 to 0.4% by weight $MgO$: 0.8 to 3% by weight $CaO$: 8 to 17% by weight $ZnO$: 3 to 8% by weight $K_2O$: 1 to 4% by weight $Na_2O$: 0.5 to 2.5% by weight $ZrO$: 0.1 to 15% by weight Pigment: 0.01 to 5% by weight Photocatalyst Layer Formation Two of the coating compositions prepared above were used in combination as described in the table below to form a lower layer and an upper layer. The lower and upper layers were formed as follows. Specifically, the coating liquids were coated on the surface of the ceramic tile with a hand spray gun (F100, manufactured by Meiji Machine Co., Ltd.) while regulating the coverage to 100 nm in terms of layer thickness after firing. Subsequently, the ceramic tile was fired in a high-temperature electric furnace (FUH732DA, manufactured by ADVANTEC) set at a maximum temperature of 800° C. for 20 hr while gradually raising and then lowering the temperature to obtain a photocatalyst-coated tile.

The proportion of zirconium titanate (% by mass) to the total amount of titanium oxide and zirconium titanate in the photocatalyst layer of the photocatalyst-coated tile was measured by the following method. Specifically, the photocatalyst layer was evaluated with an X-ray diffraction device (XRD) (X'Pert PRO, manufactured by PANalytical). A maximum peak was extracted from peaks corresponding to titanium oxide and zirconium titanate in data obtained by XRD measurement, and the proportion (% by mass) of zirconium titanate to the total amount of titanium oxide and zirconium titanate was calculated from the peak area. At the outset, previously known titanium oxide and zirconium titanate powders were mixed together at desired ratios, and the mixtures were analyzed by XRD measurement to determine a relational formula between the titanium oxide:zirconium titanate mixing ratio and the peak area ratio of the maximum peak. Subsequently, the photocatalyst layer was analyzed by XRD measurement, and the proportion (% by mass) of zirconium titanate to the total amount of titanium oxide and zirconium titanate was calculated according to the peak area of the maximum peak of titanium oxide and zirconium titanate in the obtained data.

The results were as shown in the following table.

TABLE 1

Proportion of presence of zirconium titanate

| Lower layer | Upper layer | | | |
|---|---|---|---|---|
| | 60/40 | 70/30 | 80/20 | 90/10 |
| 60/40 | 91% | 73% | 39% | 36% |
| 70/30 | — | 39% | 22% | 13% |
| 80/20 | — | — | 0% | 0% |
| 90/10 | — | — | — | 0% |

Photocatalytic Activity

The photocatalytic activity of photocatalyst-coated tiles was evaluated based on a methylene blue decomposition index according to Japanese Industrial Standards R1703-2. The results were evaluated according to the following criteria.

a decomposition index of 10 or more: excellent
a decomposition index of 5 (inclusive) to 10 (exclusive): good
a decomposition index of less than 5: poor The results were as shown in the following table.

TABLE 2

Photocatalytic activity

| Lower layer | Upper layer | | | |
|---|---|---|---|---|
| | 60/40 | 70/30 | 80/20 | 90/10 |
| 60/40 | poor | good | excellent | excellent |
| 70/30 | — | excellent | excellent | excellent |
| 80/20 | — | — | excellent | excellent |
| 90/10 | — | — | — | excellent |

Alkali Resistance Test (Evaluation of Water Resistance)

The photocatalyst-coated tiles were immersed in a 5% aqueous sodium hydroxide (guaranteed reagent, manufactured by Wako Pure Chemical Industries, Ltd.) solution kept at 50° C. After immersion for a predetermined period of time, a tape peel test was carried out based on JIS K 5600-5-6. The results were evaluated according to the following criteria.

Not peeled when immersed for 8 hr: excellent excellent
Peeled when immersed for a period of time between 6 hr and 8 hr: very good
Peeled when immersed for a period of time between 4 hr and 6 hr: good
Peeled when immersed for 4 hr or less: poor The results were as shown in the following table.

TABLE 3

| Lower layer | Upper layer | | | |
|---|---|---|---|---|
| | 60/40 | 70/30 | 80/20 | 90/10 |
| 60/40 | poor | very good-good | excellent | very good |
| 70/30 | — | excellent | very good | good |
| 80/20 | — | — | good | poor |
| 90/10 | — | — | — | poor |

Sliding Resistance Test

A sliding resistance test of the photocatalyst-coated tiles was carried out with a rubbing tester (manufactured by OHIRA RIKA Industry. Co., Ltd.). A sponge piece obtained by cutting a urethane sponge Scotch-Brite (SS-72K, manufactured by Sumitomo 3M Ltd.) into a size of 2.24 cm square was bonded with a pressure sensitive adhesive double coated tape to a head so that the nonwoven fabric part is brought to contact with a sliding surface, followed by wetting with distilled water. A weight of 250 g was placed (loading conditions: 5 kPa), and sliding was performed by a predetermined number of times. The samples were then visually inspected for the presence of surface scratch. The urethane sponge was replaced by a fresh one for each sliding of 1000 times. The results were evaluated according to the following criteria.

No noticeable scratch when slid by 10,000 times: excellent
Noticeable scratch when slid by more than 5,000 to less than 10,000 times: very good
Noticeable scratch when slid by more than 2,000 to 5,000 times: good
Noticeable scratch after sliding of 2,000 times or less: poor The results were as shown in the following table.

TABLE 4

Sliding resistance

| Lower layer | Upper layer | | | |
|---|---|---|---|---|
| | 60/40 | 70/30 | 80/20 | 90/10 |
| 60/40 | excellent | excellent | excellent | very good |
| 70/30 | — | excellent | very good | very good |
| 80/20 | — | — | good | poor |
| 90/10 | — | — | — | poor |

What is claimed is:

1. A photocatalyst member comprising a base, a glaze layer provided on the base, and a photocatalyst layer which is provided on the glaze layer, has an external surface, and contains titanium oxide and zirconium titanate, wherein:
   the content of zirconium titanate in the photocatalyst layer is 35 to 65% by mass based on the total content of titanium oxide and zirconium titanate; and
   the content of zirconium titanate, in an area of the photocatalyst layer extending from an interface between the photocatalyst layer and the glaze layer to a median line in the thickness of the photocatalyst layer, is larger than the content of zirconium titanate in an area of the photocatalyst layer near the external surface of the photocatalyst layer.

2. The photocatalyst member according to claim 1, wherein zirconium titanate is not observable on the external surface of the photocatalyst layer.

3. The photocatalyst member according to claim 1, wherein a thickness of the photocatalyst layer is 50 nm to 200 nm.

4. The photocatalyst member according to claim 1, wherein the photocatalyst member is a sanitary ware.

5. A process for producing a photocatalyst member according to claim 1, the process comprising the steps of:
   providing a base having a glaze layer;
   applying as a lower layer a first coating composition on the glaze layer to form a coating where the first coating composition contains titanium oxide and zirconium oxide at a titanium oxide:zirconium oxide weight ratio below 80:20, and drying the coating; and applying as an upper layer on the lower layer a second coating composition to form a coating where the second coating composition contains titanium oxide and zirconium oxide at a titanium oxide:zirconium oxide weight ratio that is larger than the ratio in the first coating composition for the lower layer, and firing the lower layer and the upper layer to form the photocatalyst layer such that the photocatalyst layer has an external surface and contains titanium oxide and zirconium titanate, wherein the content of zirconium titanate in the photocatalyst layer is 15 to 75% by mass based on the total content of titanium oxide and zirconium titanate; and the content of zirconium titanate in an area of the photocatalyst layer extending from an interface between the photocatalyst layer and the glaze layer to a median line in the thickness of the photocatalyst layer is larger than the content of zirconium titanate in an area of the photocatalyst layer proximate the external surface of the photocatalyst layer.

6. The process according to claim 5, wherein a firing temperature for the lower layer and the upper layer is 600 to 900° C.

7. The process according to claim 5, wherein the lower layer is formed with the coating composition having a titanium oxide:zirconium oxide weight ratio being equal to or smaller than 70:30.

8. The process according to claim 5, wherein the upper layer is formed with the coating composition having a titanium oxide:zirconium oxide weight ratio being equal to or larger than 70:30.

9. The process according to claim 5, wherein zirconium titanate is not observable on the external surface of the photocatalyst layer.

10. The process for producing a photocatalyst member according to claim 5, wherein a content of zirconium titanate in the lower layer and the upper layer is 35 to 65% by mass.

11. The process for producing a photocatalyst member according to claim 5, wherein a thickness of the lower layer and the upper layer is 50 nm to 200 nm.

12. The process for producing a photocatalyst member according to claim 5, wherein the photocatalyst member is a sanitary ware.

* * * * *